US012445806B2

(12) United States Patent
Hunukumbure et al.

(10) Patent No.: US 12,445,806 B2
(45) Date of Patent: Oct. 14, 2025

(54) METHOD AND APPARATUS FOR IMPROVEMENTS IN AND RELATING TO LOCALISATION IN A WIRELESS COMMUNICATION SYSTEM

(71) Applicant: SAMSUNG ELECTRONICS CO., LTD., Suwon-si (KR)

(72) Inventors: Mythri Hunukumbure, Staines (GB); David Gutierrez Estevez, Staines (GB); Mehrdad Shariat, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 524 days.

(21) Appl. No.: 18/054,843

(22) Filed: Nov. 11, 2022

(65) Prior Publication Data

US 2023/0156431 A1    May 18, 2023

(30) Foreign Application Priority Data

Nov. 12, 2021  (GB) ..................................... 2116341
May 4, 2022   (GB) ..................................... 2206513
Nov. 9, 2022   (GB) ..................................... 2216703

(51) Int. Cl.
*H04W 4/029*    (2018.01)

(52) U.S. Cl.
CPC ................... *H04W 4/029* (2018.02)

(58) Field of Classification Search
CPC ..... H04W 4/029; H04W 88/04; H04W 4/023; H04W 4/02; H04W 64/00; H04W 76/14
See application file for complete search history.

(56) References Cited

U.S. PATENT DOCUMENTS

2016/0204847 A1   7/2016  Ryu et al.
2017/0295531 A1  10/2017  Singh et al.
(Continued)

FOREIGN PATENT DOCUMENTS

WO    2015026111 A1    2/2015
WO    2020209631 A1   10/2020
(Continued)

OTHER PUBLICATIONS

Mythri Hunukumbure et al., "Optimising UWB based Location Tracking in Smartphones through the Support of 5G", 2022 IEEE International Conference on Consumer Electronics (ICCE), 2022, 6 pages.
(Continued)

*Primary Examiner* — Diane D Mizrahi
*Assistant Examiner* — Jing Gao

(57) ABSTRACT

The disclosure relates to a 5G or 6G communication system for supporting a higher data transmission rate. Specifically, the disclosure relates to a method of conducting localisation based on ProSe for a set of UEs in a 5G network comprising the set of UEs, an AMF, LMF, and a ProSe AS by initiating a 5G ProSe direct communication between UEs of the set of UEs and a reference UE, to relay location information from a remote UE, included in the set of UEs, via the reference UE and a 5G core, 5GC, entity for example the LMF. The method includes registering, by the set of UEs, ProSe capabilities thereof with the AMF, wherein the role of the reference UE is fulfilled by a PRU. Further, the method includes starting, by the LMF, localisation procedures.

20 Claims, 7 Drawing Sheets

(56) References Cited

U.S. PATENT DOCUMENTS

| | | |
|---|---|---|
| 2020/0053802 A1 | 2/2020 | Li et al. |
| 2020/0221478 A1* | 7/2020 | Fakoorian ......... H04W 72/0446 |
| 2022/0183057 A1 | 6/2022 | Baek |

FOREIGN PATENT DOCUMENTS

| | | |
|---|---|---|
| WO | 2021055130 A1 | 3/2021 |
| WO | 2021/138165 A1 | 7/2021 |
| WO | 2023046261 A1 | 3/2023 |
| WO | 2023048616 A1 | 3/2023 |

OTHER PUBLICATIONS

Huawei et al., "Corrections on 5G ProSe UE-to-Network Relay", Change Request, 3GPP TSG-WG SA2 Meeting #147E, Oct. 18-22, 2021, S2-2107522, 8 pages.

Philips International B.V., "TS 23.304: Updating the spec to enable NPN support", SA WG2 Meeting #146E, Aug. 16-27, 2021, S2-2106526, 80 pages.

OPPO et al., "Mega Editorial CR on 5G ProSe", Change Request, 3GPP TSG-SA WG2 Meeting #147-e, Oct. 18-22, 2021, S2-2107412, 36 pages.

International Search Report dated Feb. 16, 2023 in connection with International Patent Application No. PCT/KR2022/017786, 3 pages.

Written Opinion of the International Searching Authority dated Feb. 16, 2023 in connection with International Patent Application No. PCT/KR2022/017786, 4 pages.

United Kingdom Intellectual Property Office, "Combined Search and Examination Report under Sections 17 and 18(3)," issued May 19, 2023, in connection with GB Application No. 2216703.5, 8 pages.

ETSI TS 123 304 V17.3.0 (Jul. 2022) Technical Specification; 5G; Proximity based Services (ProSe) in the 5G System (5GS); (3GPP TS 23.304 version 17.3.0 Release 17); 107 pages.

Supplementary European Search Report dated Jan. 31, 2025, in connection with European Patent Application No. 22893282.8, 10 pages.

Samsung, "KI#7: New Solution on Support for SGS Localization via Reference UE," S2-2202180 (Revision of S2-220xxxx), 3GPP SA WG2 Meeting #150E, Apr. 6-12, 2022, 4 pages.

3GPP TR 23.700-71 V0.2.0 (Apr. 2022) Technical Report, 3rd Generation Partnership Project; Technical Specification Group Services and System Aspects; Study on enhancement to the 5GC LoCation Services (LCS); Phase 3 (Release 18), 68 pages.

\* cited by examiner

METHOD AND APPARATUS FOR IMPROVEMENTS IN AND RELATING TO LOCALISATION IN A WIRELESS COMMUNICATION SYSTEM

CROSS-REFERENCE TO RELATED APPLICATIONS

This application is based on and claims priority under 35 U.S.C. § 119 to United Kingdom Patent Application No. 2116341.5 filed on Nov. 12, 2021, United Kingdom Patent Application No. 2206513.0 filed on May 4, 2022, and United Kingdom Patent Application No. 2216703.5 filed on Nov. 9, 2022, in the United Kingdom Intellectual Property Office, the disclosure of which is incorporated by reference herein in its entirety.

BACKGROUND

1. Field

The disclosure relates to localisation in a wireless communication system. Localisation, in this context, refers to the process of the network determining the location of one or more user equipments (UEs) in a wireless communication system. Localisation may also be known as positioning and both terms are used interchangeably in the art.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service-based architecture or service-based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, meta-material-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

The present disclosure relates to wireless communication systems and, more specifically, the present disclosure relates to a method and apparatus for improvements in and relating to localisation in a wireless communication system.

Embodiments of the present disclosure relate to the use of proximity services (ProSe) based device to device (D2D) localisation, which can be applied for localisation in different scenarios, from in-coverage group, or set, of UEs to range extension in connecting out-of-coverage UEs. A common feature of embodiments of the disclosure is the leveraging and enhancement of fifth generation (5G) ProSe direct communication and 5G ProSe UE-to-Network Relay techniques to support location reporting. Embodiments of the disclosure provide enhanced messaging between different functions to orchestrate this ProSe based localisation. Further, additional embodiments, including the configuration of localisation privacy indication (LPI) are disclosed.

3GPP SA2 completed the enhanced location services (eLCS) phase 2 work item in Release 17. There is strong support for both localisation and ProSe topic continuation. D2D based localisation may be prominent in SA2 Release 18, as there is also a strong interest in the RAN counterpart, the NR-sidelink based positioning.

A problem in the prior art is that there is currently no means provided to allow ProSe to support the obtaining of location estimates or assistance data for a group or set of UEs. This problem falls between the domains of localisation, ProSe and relaying.

It is an aim of embodiments of the present disclosure to address shortcomings in the prior-art and provide an improved localisation solution.

According to the present disclosure there is provided an apparatus and method as set below. Other features of the disclosure will be apparent from the description which follows.

According to an aspect of the disclosure, a solution is provided whereby ProSe based D2D localisation can be conducted for a group of UEs or set of UEs for the purpose of one or more of: signalling overhead reduction; out-of-coverage localisation; and under range extension.

Embodiments of the disclosure provide an architectural arrangement to initiate a 5G ProSe direct communication and a 5G ProSe UE-to-Network relay to share location information between a remote UE and 5G core (5GC) (e.g., a location management function, LMF).

Furthermore, a privacy issue may arise in these scenarios, as the UEs may pass their location information through a ProSe-enabled UE (as lead UE or a ProSe UE-to-Network relay) which may want to know such a lead UE before giving privacy consent. Embodiments of the disclosure provide a solution to achieve this LPI and update the 5GC (e.g., the LMF) on this LPI.

Embodiments of the disclosure enhance 5G ProSe direct communication and 5G ProSe UE-to-Network relay and associated capabilities for location reporting. In the following, reference is made to a Lead UE and/or a UE-to-Network relay. The skilled person will understand that, depending on the context, the lead UE may act as a UE-to-Network relay.

For the purposes of this disclosure, it is worth noting that the functionality of a 5G ProSe UE-to-Network relay (or lead UE) is assumed to be carried out by a so-called Reference UE, so the terms 5G ProSe UE-to-Network relay and a reference UE can be used indistinctly. In addition to the relaying capabilities proposed in this disclosure, a reference UE is understood to determine a reference plane and reference direction when performing ranging or sidelink positioning between two or more UEs, as defined in 3GPP TR 23.700-86. In addition, a UE acting as reference UE to other UEs may also act as positioning reference unit (PRU) to the network, whereby a PRU is defined as a UE with known location to the network that may assist with the enhancement of the positioning performance of other UE(s), as defined in 3GPP TS 38.305.

According to an aspect of the present disclosure, there is provided a system of localisation whereby a location management function (LMF) in the network is arranged to access certain other functions in the network to orchestrate this localisation, both in in-coverage and out-of-coverage scenarios.

In an embodiment, out-of-coverage localisation and/or under-range extension are achieved by means of configuring the LMF to orchestrate the localisation activity and to have contact with such other network functions as are required. In a preferred embodiment, this contact is direct contact. Details of this contact and the means by which this can be achieved are shown in the accompanying figures.

A first aspect provides a method of conducting localisation based on proximity services, ProSe, (e.g., ProSe based D2D localisation) for a set of UEs, in a 5G network comprising the set of UEs, an access and mobility management function (AMF), a location management function (LMF), and a ProSe application server (AS) for example for a purpose of signalling overhead reduction and/or range extension, by initiating a 5G ProSe direct communication, for example between UEs of the set of UEs and a reference UE, for example included in the set of UEs, to share and/or relay location information between and/or from a remote UE, included in the set of UEs, for example via the reference UE and/or a 5G core, 5GC, (e.g., a 5GC entity) for example the LMF.

In an embodiment, the method comprises registering, by the set of UEs, ProSe capabilities thereof the AMF, for example with an intention to select a UE from the set of UEs or from outside the set of UEs if the UE is in D2D range, as a reference UE. In one example, the role of the reference UE is fulfilled by a positional reference unit (PRU), as defined in 3GPP Release 18.

In an embodiment, registering, by the set of UEs, the ProSe capabilities thereof with the AMF comprises giving, by the set of UEs to the AMF, location privacy indicators (LPIs), for localisation based on ProSe thereof.

In an embodiment, the method comprises starting, by the LMF, localisation procedures.

In an embodiment, the method comprises identifying, by the LMF, the set of UEs with certain group or collective behaviour.

In an embodiment, the method identifying, by the LMF, the set of UEs with certain group or collective behaviour is based on internal logic within the LMF or input data from other Network Functions, NFs.

In an embodiment, identifying, by the LMF, the set of UEs with certain group or collective behaviour comprises considering, by the LMF, all UEs within an area of interest for ProSe based localisation, leaving any grouping or pairing to direct discovery protocol of the ProSe.

In an embodiment, the method comprises checking, by the LMF, the ProSe capabilities of the set of UEs registered with the AMF.

In an embodiment, the method comprises requesting or subscribing, by the LMF, a newly defined service of the ProSe AS to initiate relay for location reporting for the set of UEs; or interacting, by the LMF with a policy control function, PCF, to initiate relay for location reporting for the set of UEs.

In an embodiment, the method comprises authorizing and configuring, by the ProSe application server or the PCF, a UE of the set of UEs as the reference UE, through which the other UEs of the set of UEs relay location information to the 5GC and LMF. In one example, the reference UE is outside the set of UEs but still within D2D range or, the reference UE role is fulfilled by a PRU (Positional Reference Unit).

In an embodiment, the method comprises configuring or provisioning the reference UE with special relay service codes (RSCs) authorized for location reporting, optionally wherein the special RSCs are provided by the PCF or already provisioned in the Mobile Equipment, ME, or the reference UE, or configured in the universal integrated circuit card (UICC).

In an embodiment, the method comprises authorizing, configuring or provisioning, by the ProSe application server or the PCF, the other UEs of the set thereof with special RSCs authorized for location reporting, optionally wherein the special RSCs are provided by the PCF or already provisioned in the ME or configured in the UICC.

In an embodiment, the method comprises conducting ProSe relay discovery on the identified set of UEs with special RSCs based on either discovery model A or discovery model B, wherein the discovery model A and the discovery model B are defined in TS 23.303 and TS 23.304, respectively.

In an embodiment, the method comprises establishing connections over PC5 between the reference UE and the other UEs of the set thereof, for the discovered set of UEs.

In an embodiment, the method comprises responding or notifying, by the ProSe AS or the PCF to the LMF, when the relay configuration is complete.

In an embodiment, the method comprises requesting, by the LMF location data from multiple UEs of the set thereof, via the reference UE.

In an embodiment, the method comprises initiating, by the reference UE, side-link based positioning for the multiple UEs of the set thereof, optionally including: obtaining, by the reference UE through the side-link, position estimates from the set of UEs; by the reference UE through the side-link, obtaining, by the reference UE through the side-link, which UE of the set of UEs may carry out UE based positioning; obtaining, by the reference UE through the side-link, positioning assistance data from the set of UEs; and/or executing, by the reference UE through the side-link, a side-link based positioning method and gaining position information of the group of UEs.

In an embodiment, the method comprises relaying, by the reference UE, location reporting data back to the LMF.

In an embodiment, the method is carried out with the support of a positional reference unit (PRU) instead of a reference UE.

In an embodiment, the signalling overhead reduction is by means of positioning protocol messages and/or range extension by gaining location information of UEs outside the network coverage area.

In an embodiment, the location information is passed onto a location service (LCS) client through the AMF and a gateway mobile location centre (GMLC).

A second aspect provides a 5G network comprising a set of UEs, an access and mobility management function (AMF), a location management function, (LMF), and a ProSe application server (AS) configured to implement the method according to the first aspect.

Although a few preferred embodiments of the present disclosure have been shown and described, it will be appreciated by those skilled in the art that various changes and modifications might be made without departing from the scope of the disclosure, as defined in the appended claims.

For a better understanding of the disclosure, and to show how embodiments of the same may be carried into effect, reference will now be made, by way of example only, to the accompanying diagrammatic drawings in which:

Aspects of the present disclosure provide efficient communication methods in a wireless communication system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
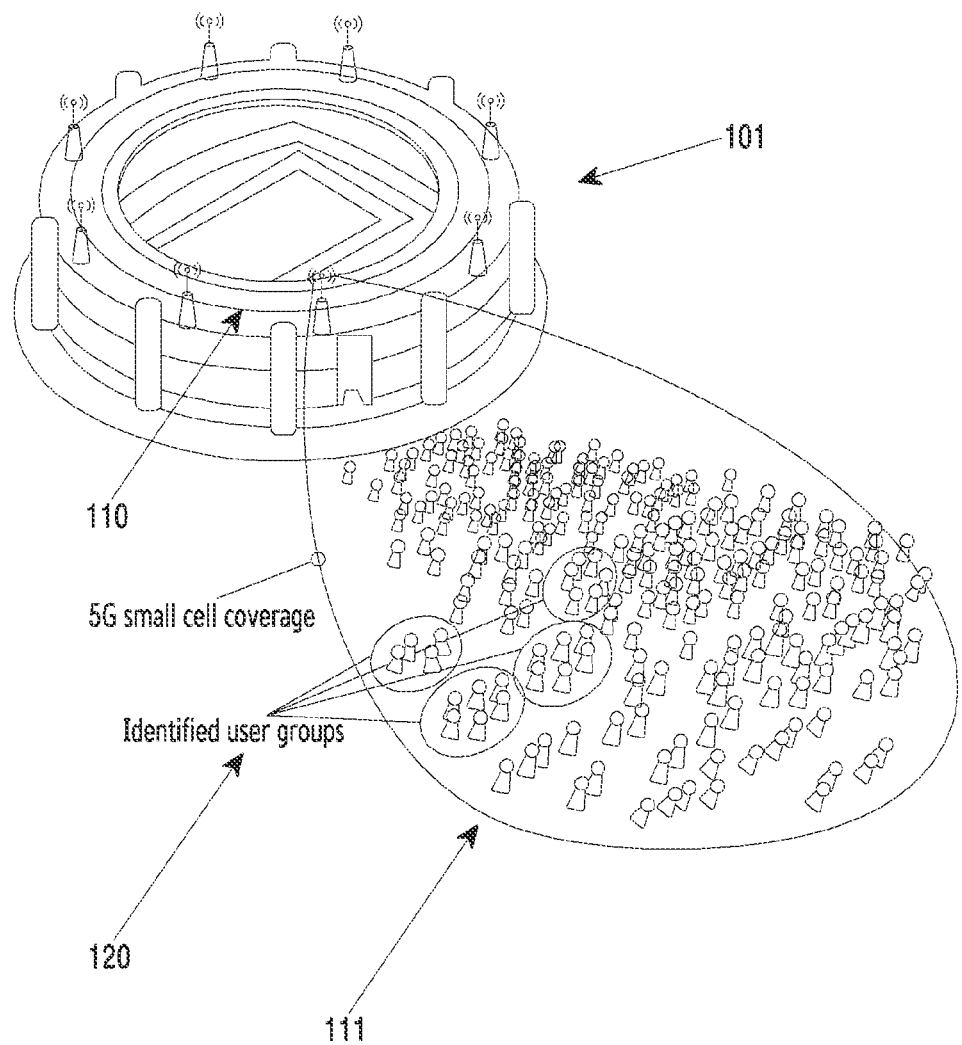
FIG. 1 illustrates a representation of a first scenario according to an embodiment of the present disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Accordingly, the embodiment herein is to provide a method of conducting localisation based on ProSe for a set of UEs in a 5G network comprising the set of UEs, an AMF, a LMF, and a ProSe AS by initiating a 5G ProSe direct communication between UEs of the set of UEs and a reference UE, to relay location information from a remote UE, included in the set of UEs, via the reference UE and a 5G core, 5GC, entity for example the LMF. The method includes registering, by the set of UEs, ProSe capabilities thereof with the AMF, for example with an intention to select a UE from the set of JEs or from outside the set of UEs if the UE is in D2D range, as the reference UE; optionally wherein the role of the reference UE is fulfilled by a PRU. Further, the method includes starting, by the LMF, localisation procedures. Further, the method includes identifying, by the LMF, the set of UEs with certain group or collective behaviour.

In an embodiment, the method includes registering, by the set of UEs, the ProSe capabilities thereof with the AMF comprises giving, by the set of UEs to the AMF, LPIs for localisation based on ProSe thereof.

In an embodiment, the method includes identifying, by the LMF, the set of UEs with certain group or collective behaviour is based on internal logic within the LMF or input data from other NFs.

In an embodiment, the method includes identifying, by the LMF, the set of UEs with certain group or collective behaviour comprises considering, by the LMF, all UEs within an area of interest for ProSe based localisation, leaving any grouping or pairing to direct discovery protocol of the ProSe.

In an embodiment, the method includes checking, by the LMF, the ProSe capabilities of the set of UEs registered with the AMF.

In an embodiment, the method includes comprising requesting or subscribing, by the LMF, a newly defined service of the ProSe AS to initiate relay for location reporting for the set of JEs; or interacting, by the LMF with a Policy Control Function, PCF, to initiate relay for location reporting for the set of UEs.

In an embodiment, the method includes authorizing and configuring, by the ProSe application server or the PCF, a UE of the set of UEs as the reference UE, through which the other UEs of the set of UEs relay location information to the 5GC and LMF; optionally wherein the reference UE is outside the set of UEs but still within D2D range or optionally wherein the reference UE role is fulfilled by an PRU.

In an embodiment, the method includes configuring or provisioning the reference UE with special RSCs authorized for location reporting, optionally wherein the special RSCs are provided by the PCF or already provisioned in the mobile equipment (ME), or the reference UE, or configured in the UICC.

In an embodiment, the method includes authorizing, configuring or provisioning, by the ProSe application server or the PCF, the other UEs of the set thereof with special RSCs authorized for location reporting, optionally wherein the special RSCs are provided by the PCF or already provisioned in the ME or configured in the UICC.

In an embodiment, the method includes conducting ProSe relay discovery on the identified set of UEs with special RSCs based on either discovery model A or discovery model B. Further, the method includes establishing connections over PC5 between the reference UE and the other UEs of the set thereof, for the discovered set of UEs.

In an embodiment, the method includes responding or notifying, by the ProSe AS or the PCF to the LMF, when the relay configuration is complete. Further, the method includes requesting, by the LMF location data from multiple UEs of the set thereof, via the reference UE.

In an embodiment, the method includes initiating, by the reference UE, side-link based positioning for the multiple UEs of the set thereof. Further, the method optionally includes obtaining, by the reference UE through the side-link, position estimates from the set of UEs; by the reference UE through the side-link, obtaining, by the reference UE through the side-link, which UE of the set of UEs may carry out UE based positioning, obtaining, by the reference UE through the side-link, positioning assistance data from the set of UEs, and executing, by the reference UE through the side-link, a side-link based positioning method and gaining position information of the group of UEs.

In an embodiment, the method is carried out with the support of a PRU instead of a reference UE. the signalling overhead reduction is by means of positioning protocol messages and/or range extension by gaining location information of UEs outside the network coverage area and the location information is passed onto an LCS client through the AMF and a GMLC.

Accordingly, the embodiment herein is to provide A 5G network comprising a set of UEs, an AMF, an LMF, and a ProSe AS.

A first embodiment of the present disclosure relates to a first scenario concerned with reducing an overhead associated with location signalling.

Many high-volume localisation applications (such as stadium/theme park/train platform entry and shopping mall visitor tracking) show intrinsic group or collective behaviour patterns among the users. These joint patterns can be identified and effectively used in D2D based localisation to reduce the signalling overheads significantly. Architectural support for D2D based localisation has not yet discussed in standardisation meetings, and is likely to be a key topic for a future release. In this scenario, all the UEs may be "in coverage," i.e., the 5GC (e.g., an LMF) may be able to communicate with the individual UEs directly.

The LMF may preferably identify possible UEs to perform localisation in a D2D mode. This also requires interaction with 5GC (e.g., AMF, the ProSe application server, PCF or UDM), as will be outlined below, to check the ProSe capabilities of the UEs and to check the updated LPI status of each UE to share location information through another UE (e.g., a lead or a ProSe UE-to-Network Relay). Even with a sub-set of the initially identified UEs, significant savings in positioning protocol message overheads (e.g., LPP) between the UE and the network can be achieved as shown in 3GPP standard specification.

FIG. 1 through FIG. 7, discussed below, and the various embodiments used to describe the principles of the present disclosure in this patent document are by way of illustration only and should not be construed in any way to limit the scope of the present disclosure. Those skilled in the art will understand that the principles of the present disclosure may be implemented in any suitably arranged system or device.

FIG. 1 illustrates a representation of a first scenario according to an embodiment of the present disclosure.

A depiction of a location signalling reduction in this scenario 1 is shown in FIG. 1, which shows a stadium 101 having a 5G-NR access point 110 having an associated coverage area 111. Within the coverage area are a plurality of individual users. Some of these users may be considered as one or more identified user groups 120, as set out above.

A second embodiment relates to localisation through non-public network range extension.

In this scenario, D2D links are used to extend the range of a network, in particular a private or non-public network (NPN). In this example, the network whose range is extended is an Industry IoT (IIoT) network, where the NPN spans the area of the industry site and is operable to locate all the people and connected devices (lorries, forklifts etc) within the site for reasons such as process efficiency or safety/security.

Figure 2:
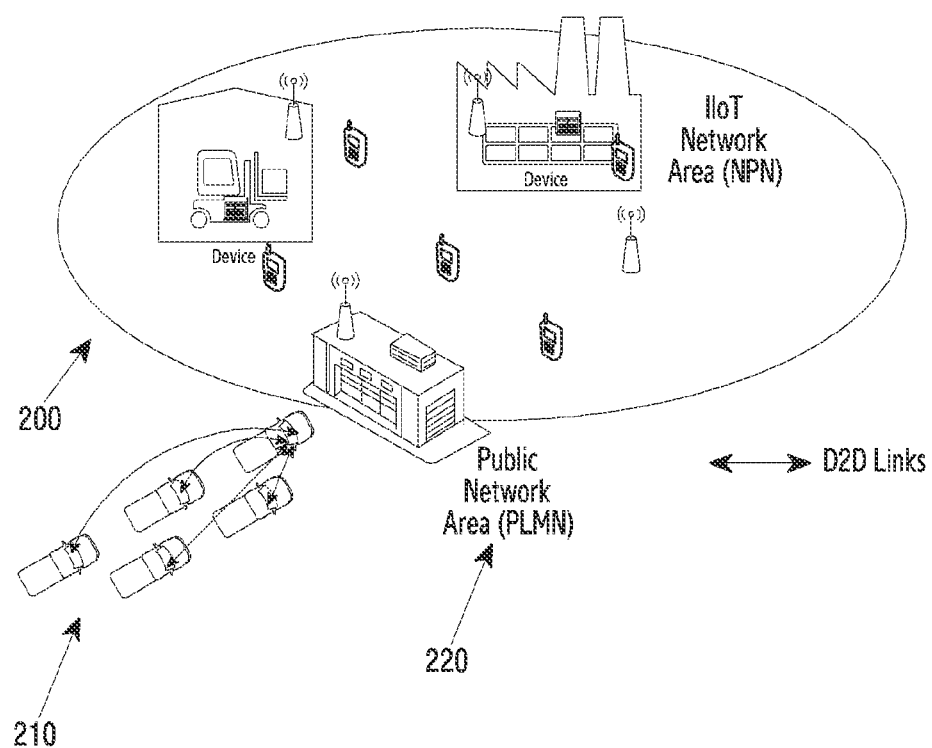
FIG. 2 illustrates a representation of a second scenario according to an embodiment of the present disclosure.

FIG. 2 shows a representation of this scenario.

FIG. 2 illustrates a representation of a second scenario according to an embodiment of the present disclosure.

A factory or similar environment has an IIoT network which has a coverage area depicted by 200. Outside this area, there is a PLMN 220.

There may be related people or devices just outside the site (and beyond the NPN full coverage area), where the NPN network may have a legitimate reason or benefit in localizing such devices. As an example, these devices may be lorries 210 carrying supplies to the site, which are waiting in a queue to get clearance to enter. As the NPN APs may have weaker coverage as the queue extends beyond the range of the NPN, the NPN has to rely on the PLMN if this is available at the site. However, extra payments may have to be made to the PLMN to get this service and delays in the service can also occur, both of which are undesirable.

An alternative and a cost/time efficient solution is to utilize the D2D (i.e., ProSe) connection capability between the devices (or UEs) of the lorries in this scenario. Such D2D links are shown by the arrows between the lorries 210. The First lorry in the queue (i.e., the one nearest the factory) may have reasonable coverage from the NPN and can be localized through the NPN APs. The first lorry (or device) can request the use of D2D capability from subsequent lorries in the queue —for them to be localized through D2D. Furthermore, for this localisation process, relaying messages through the lead UE (i.e., the first lorry) can be configured.

This example shows a form of range extension of the NPN, achieved through the first device in the queue, which has good connections to the NPN. The range of the NPN is effectively extended by means of the D2D links between the first and subsequent lorries. In this way, a remote lorry which may be unreachable for being beyond the range of the NPN, can still be localised by the NPN via use of the D2D link(s) between the remote lorry and the NPN, possibly via one or more intermediate lorries.

Figure 3:
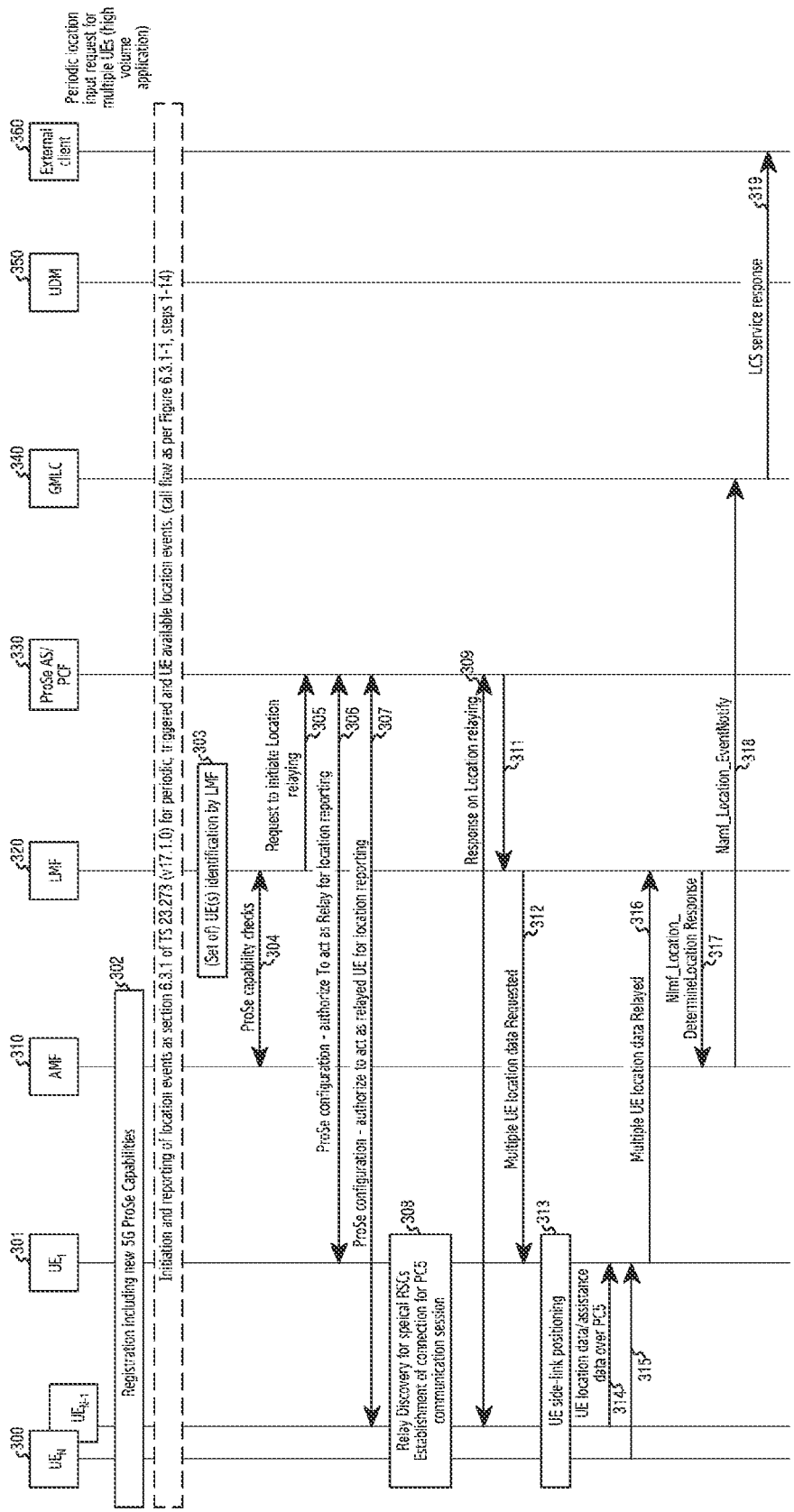
FIG. 3 illustrates a message flow associated with the first scenario according to an embodiment of the present disclosure.

FIG. 3 illustrates a message flow associated with the first scenario.

Returning to the first embodiment, FIG. 3 shows a message flow diagram associated with this embodiment.

One of the main benefits of identifying intrinsic groups 120 within the plurality of users shown in FIG. 1 and using ProSe within the group or set of UEs to relay location information back to the 5GC (e.g., LMF) in this scenario is the overhead reduction in positioning protocol messages. It is assumed that there is a periodic localisation request from a LCS client and the initial localisation steps are already conducted, and the LMF has started individual tracking of the UEs. In some applications (e.g., in private networks), the UEs may readily share the location information with any other member UEs, so it can be assumed that the LPI is already granted for ProSe scenarios before the start of the localisation process. The associated call flow is shown In FIG. 3 and details of the individual steps follow.

At step 302, the ProSe capabilities of the UEs 300, 301 may be registered with the AMF 310 beforehand. A new information element (IE) may be registered as part of this step indicating the support for location reporting in addition to other ProSe capabilities. Also, the LPI for ProSe based localisation may be given by the UE's at this stage, again to the AMF 310.

When the localisation request comes from the LCS 360 client for a high-volume application, the LMF 320 may start the localisation procedures as in a default scenario for periodic location requests, as given by 3GPP standard specification TS23.273.

At step 303, the LMF 320 may identify a set of UEs 300, 301 with certain group or collective behaviour and thus can take steps to initiate the ProSe based localisation for these UEs. This can be based on internal logic within LMF or input data from other NFs. Alternatively, the LMF 320 may consider all UEs within an area of interest for ProSe based localisation, leaving any grouping or pairing to the direct discovery protocol of the ProSe.

At Step 304, the LMF 320 may check the ProSe capabilities registered for the UEs (in Step 302), with the AMF 310.

At Step 305, for the UEs supporting ProSe capability (including also location reporting), the LMF 320, may request or subscribe to a newly defined service of the ProSe application server 330 to initiate Relay for location reporting. As an alternative, the LMF 320 may interact with policy control function (PCF) 330 instead of ProSe application server 330 for step 305.

At Step 306, the ProSe application server (or the PCF) 330 may authorize and configure a UE as lead UE 301 or a ProSe UE-to-Network relay through which the other UEs 300 can relay location information to the 5GC and LMF 320. The lead UE 201 is configured or provisioned with special Relay Service Codes (RSCs) authorized for location reporting. This is provided by the PCF 330 or already provisioned in the ME or UE, or configured in the universal integrated circuit card (UICC).

At step 307, the ProSe application server (or the PCF) 330 may authorize, configure or provision other UEs with special RSCs authorized for location reporting. This is provided by the PCF 330 or already provisioned in the ME or configured in the UICC.

At Step 308, the ProSe relay discovery on the UEs identified in Steps 303 to 305, is conducted with special RSCs based on either model A or model B. The discovery model A and discovery model B are known in the prior art as defined in TS 23.303 and TS 23.304.

once discovered, the connections between the lead UE 301 or a ProSe UE-to-Network relay and the other UEs 300 are established over PC5.

At step 309 and 311, the ProSe application server (or PCF) 330 may respond or notify to the LMF 320, when the relay configuration is complete (e.g., based on a notification received by AMF 310 or SMF (not shown) from the ProSe UE-to-Network relay after completion). It is not necessary to establish any user plane (UP) protocol data unit (PDU) session for such special RSCs between the ProSe UE-to-Network relay and network as such RSCs may not be associated with any specific PDU session parameters.

At step 312, the LMF 220 may request location data from multiple UEs 300, via the lead UE 301 or ProSe UE-to-Network relay.

At step 313, the lead UE 301 or ProSe UE-to-Network relay may initiate side-link based positioning for the multiple UEs 300 (as instructed by the LMF 320 in step 312). This may include obtaining position estimates from the group of UEs 300, who may carry out UE based positioning, obtaining positioning assistance data from these UEs or even executing a side-link based positioning method (and gaining position information of the group of UEs). Whatever the method used, the lead UE 301 or ProSe UE-to-Network relay may collect this data through the side-link in step 313.

At step 314 to 315, the UEs 300 may provide this data over PC5 communication session to the lead UE 201 as established in step 308, 309, and 311.

At step 316, the lead UE 301 or ProSe UE-to-Network relay may relay location reporting data back to the LMF 320. This can be over NAS MM messages via the AMF 310 or NAS SM messages via SMF (not shown). The signalling overhead reduction comes by means of positioning protocol messages (e.g., LPP) from the lead UE 301 or ProSe UE-to-Network relay to the LMF 320. If the location information from multiple UEs is concatenated into fewer protocol messages at the lead UE 301 or at the ProSe UE-to-Network relay, then there are significant signalling overhead savings, when compared to prior art techniques where such a direct link between the lead UE 301 and the LMF 320 is not possible.

In steps 317 to 319, the location information is passed onto the LCS client 360, through the AMF 310 and the GMLC 340. These steps are not changed from the default location responses in the prior art in TS23.273.

The configuration (or provisioning) of the lead UE 301 or other UEs in step 306 or step 307 can be considered as part of ProSe Policy, as one component in UE route selection policy (URSP) or as part of any other side link/ranging policies to be configured (or provisioned) to the sidelink positioning-enabled UEs for this purpose.

Special RSCs in steps 306 to 308 (or step 309 and 311) can be replaced by any other ProSe identifiers or side link identifiers exchanged as part of discovery operations for sidelink positioning and ranging in order to authorize location reporting.

As will be appreciated, the direct messaging between the lead UE 301 and the LMF 320 reduces the signalling overhead significantly.

In the previous description, relating to FIG. 3, it was assumed that the LPI is provided to the AMF 310 before the ProSe based localisation process begins. However, in some situations, the UEs 300, 301 may want to provide or update their LPI (e.g., on the fly or in real time). This is especially true in cases where the networks are more open to subscribers and where the set of UEs, groups and lead UEs are chosen from a wide variety of UEs.

In another embodiment of this disclosure, the AMF 310 advises the LMF 320 and/or GMLC 340 of the need for LPI, in step 304. The LMF 320 and/or GMLC 340 may then indicate the need for LPI to the ProSe application server (or PCF) 330, in the message in step 305. The ProSe application server (or PCF) 330, in steps 306 and 307, may indicate to the UEs (lead UE 301 or ProSe UE-to-Network relay and other UEs 300) to provide the new LPI to the AMF 310. The UEs (this can be a subset of UEs if all of the UEs do not agree on using ProSe for localisation in this context) may provide the LPI in NAS messaging to the AMF 310 at this stage, and the AMF 310 may record these LPIs in the user data repository (UDR), to be accessed via the unified data management function (UDM) 350. These steps are additional steps, positioned between steps 307 and 308 in the message flow shown in FIG. 3.

The LMF 320 and/or GMLC 340 then checks the LPI status with the UDM 350 in a new step, preceding step 312.

Once the LMF 320 and/or the GMLC 340 receives the LPI indications from the UDM 350, the LMF 320 (or LMF 320 on notification from GMLC 340) only selects the UEs who have given a positive LPI. The LMF 320 requests the location information for these UEs from the lead UE 301 or ProSe UE-to-Network relay in step 312. The remaining steps may follow, as in FIG. 3, for this subset of UEs.

Referring again to FIG. 2 and the scenario depicted therein, this embodiment relates to a situation where out-of-coverage UEs can relay their location through an in-coverage UE, for commercial applications. A private NPN is assumed in this illustration, where all UEs (and devices) within and coming into the NPN have given their privacy consent to be localized by the NPN. This range extension situation occurs when some of the UEs of the lorries 210 are just outside the NPN 200, waiting for entry into the industry premises. However, these UEs or devices may not have given their privacy consent to be localized through another "lead" UE or ProSe UE-to-Network Relay. In this case, explicit LPI is needed to proceed with the ProSe based localisation and then Relaying. This issue is addressed in the following.

Figure 4:
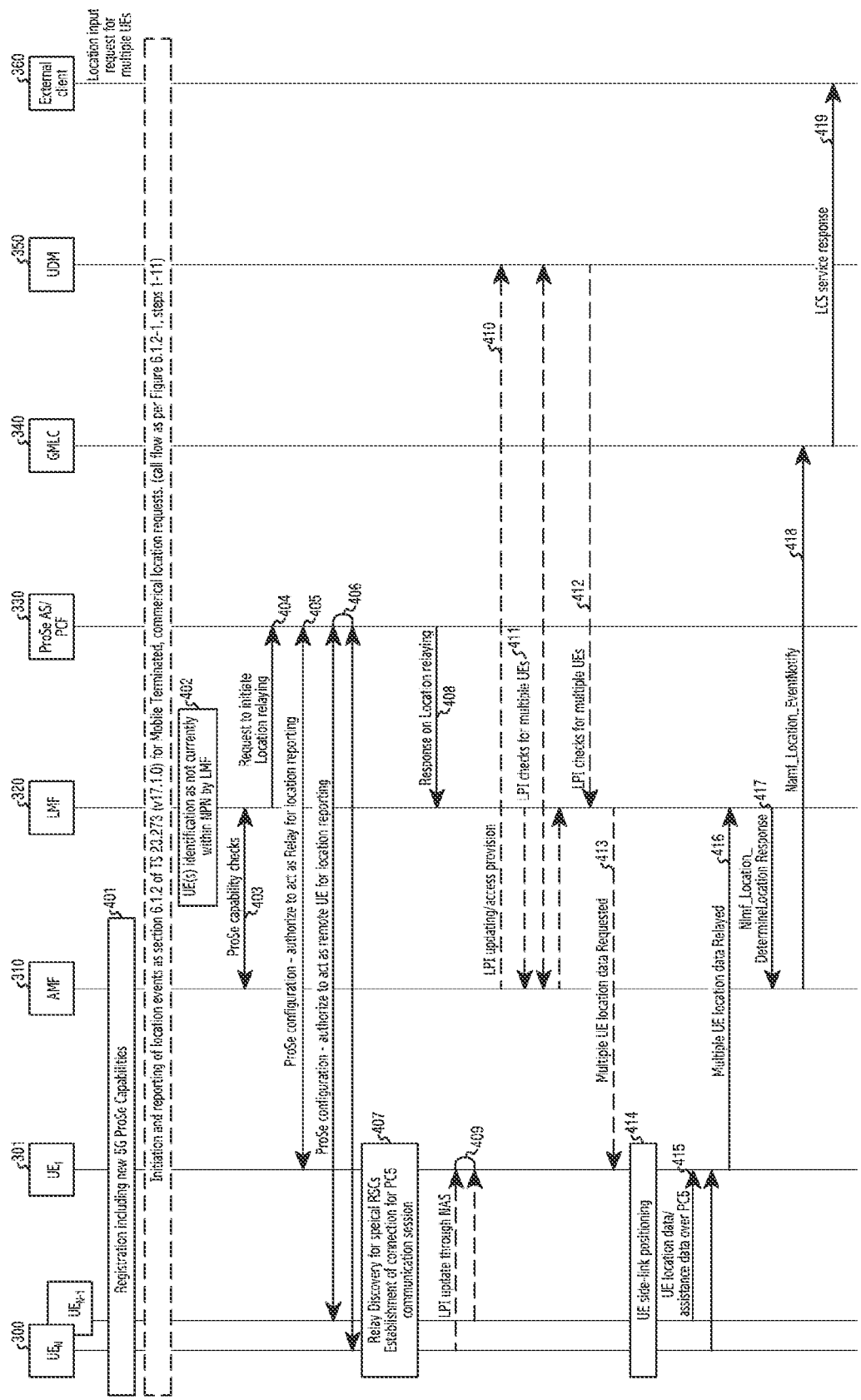
FIG. 4 illustrates a message flow associated with the second scenario according to an embodiment of the present disclosure.

FIG. 4 illustrates a message flow associated with the second scenario according to an embodiment of the present disclosure.

FIG. 4 shows a call flow according to this embodiment of the disclosure. The entities here share reference numerals with similar entities in FIG. 3, but it will be appreciated that each may perform different functions depending upon the exact embodiment. The steps are labelled 401 to 419.

At step 401, the call flow starts registration including new 5G ProSe capabilities. With a multiple UE localisation request by the LCS client 360. The LMF 320 carries out these localisations as per the default MT-LR procedure detailed in TS 23.273, known in the prior art.

At Step 402, the LMF 320 notices that some of the UEs 300 or devices needing localisation are not within the NPN 100.

At Step 403, the LMF 320 makes ProSe capability checks for these devices (from Step 402) with the AMF 310. These ProSe capabilities may have been registered with the AMF previously, or even the wider PLMN can be used by the AMF to carry out these capability checks, as part contained in TS 23.700-07.

At Step 404, for the UEs that show ProSe capability, the LMF 320 requests the ProSe Application Server (or PCF) 330 to initiate ProSe configuration, through UE(s) at the cell edge of the NPN.

At Steps 405 and 406, the ProSe authorization, configuration and provisioning is carried out by the ProSe application server (or the PCF) 330. The lead UE 301 configuration at the cell edge can be done through the NPN, but for the other "remote" UEs, the configuration is done based on parameters already provisioned in the ME or UE or configured in the UICC.

At steps 407, the relay discovery for the special RSC's used and the establishment of a PC5 communication session are executed. These steps are similar to steps 308 of FIG. 3 and so are not described again.

At Step 408, the ProSe AS or the PCF 330 respond back to the LMF 320, indicating the establishment of the Relay links. This step is similar to step 309 and 311 of FIG. 3.

At Step 409, the UEs provide LPI through NAS messaging to the AMF 310. This step is optional, as in some cases, the UE configuration itself can carry this consent for localisation in the relay mode. Physically, these messages are relayed through by the lead UE 301. The LPI are then recorded in the UDR and managed by UDM 350, as shown in step 410.

For step 411 and 412, there are two possible variants. In the first variant (step 411), the LMF 320 accesses the AMF 310 to acquire an update of the LPI information. The AMF 310 exchanges messages with the UDM 350 and then the AMF 310 can report back to the LMF 220. In the second variant (step 412), the LMF 320 (either itself or in coordination with the GMLC 340) directly accesses the UDM 350 for LPI information for these multiple UEs. Step 411 is the quicker option but requires some changes to the capabilities of LMF 320 to enable this direct access.

At Step 413, for the UEs who provide positive LPI, the LMF 320 may request the lead UE 301 to provide the location information.

Steps 414 to 419 are similar to steps 313 to 319 shown in FIG. 3, so further description is omitted for brevity.

The configuration (or provisioning) of the lead UE 301 or other UEs in step 405 or step 406 can be considered as part of ProSe Policy, as one component in UE Route Selection Policy (URSP) or as part of any other side link/ranging policies to be configured (or provisioned) to the Sidelink Positioning-enabled UEs for this purpose.

Special RSCs in steps 405 to 407 can be replaced by any other ProSe identifiers or side link identifiers exchanged as part of discovery operations for Sidelink Positioning and Ranging in order to authorize location reporting.

Figure 5:
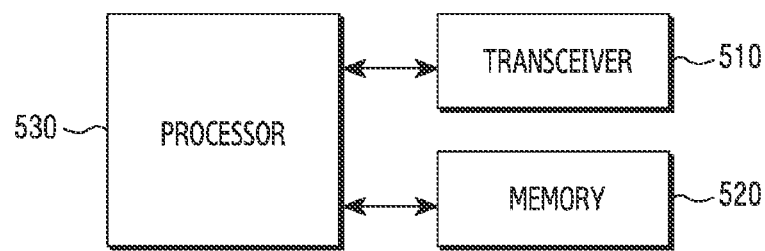
FIG. 5 illustrates a structure of a UE according to an embodiment of the present disclosure.

FIG. 5 illustrates a structure of a UE according to an embodiment of the disclosure. Furthermore, the UE may correspond to UE 200, 201 of FIGS. 3 and 4.

As shown in FIG. 5, the UE according to an embodiment may include a transceiver 510, a memory 520, and a processor 530. The transceiver 510, the memory 520, and the processor 530 of the UE may operate according to a communication method of the UE described above. However, the components of the UE are not limited thereto. For example, the UE may include more or fewer components than those described above. In addition, the processor 530, the transceiver 510, and the memory 520 may be implemented as a single chip. Also, the processor 530 may include at least one processor.

The transceiver 510 collectively refers to a UE receiver and a UE transmitter, and may transmit/receive a signal to/from a base station or a network entity. The signal transmitted or received to or from the base station or a network entity may include control information and data. The transceiver 510 may include a RF transmitter for up-converting and amplifying a frequency of a transmitted signal, and a RF receiver for amplifying low-noise and down-converting a frequency of a received signal. However, this is only an example of the transceiver 510 and components of the transceiver 510 are not limited to the RF transmitter and the RF receiver.

Also, the transceiver 510 may receive and output, to the processor 530, a signal through a wireless channel, and transmit a signal output from the processor 530 through the wireless channel.

The memory 520 may store a program and data required for operations of the UE. Also, the memory 520 may store control information or data included in a signal obtained by the UE. The memory 520 may be a storage medium, such as read-only memory (ROM), random access memory (RAM), a hard disk, a CD-ROM, and a DVD, or a combination of storage media.

The processor 530 may control a series of processes such that the UE operates as described above. For example, the transceiver 510 may receive a data signal including a control signal transmitted by the base station or the network entity, and the processor 530 may determine a result of receiving the control signal and the data signal transmitted by the base station or the network entity.

Figure 6:
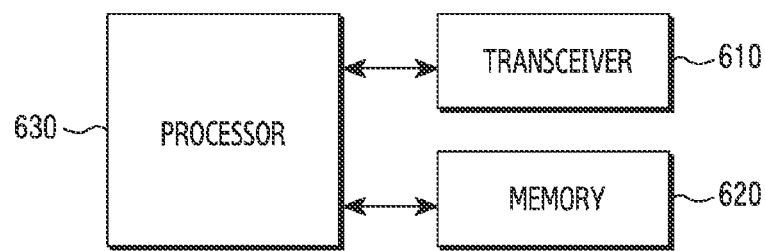
FIG. 6 illustrates a structure of a base station according to an embodiment of the present disclosure.

FIG. 6 illustrates a structure of a base station according to an embodiment of the present disclosure. Furthermore, the base station may correspond to base station of FIG. 2.

As shown in FIG. 6, the base station according to an embodiment may include a transceiver 610, a memory 620, and a processor 630. The transceiver 610, the memory 620, and the processor 630 of the base station may operate according to a communication method of the base station described above. However, the components of the base station are not limited thereto. For example, the base station may include more or fewer components than those described above. In addition, the processor 630, the transceiver 610, and the memory 620 may be implemented as a single chip. Also, the processor 630 may include at least one processor.

The transceiver 610 collectively refers to a base station receiver and a base station transmitter, and may transmit/receive a signal to/from a terminal or a network entity. The signal transmitted or received to or from the terminal or a network entity may include control information and data. The transceiver 610 may include a RF transmitter for up-converting and amplifying a frequency of a transmitted signal, and a RF receiver for amplifying low-noise and down-converting a frequency of a received signal. However, this is only an example of the transceiver 610 and components of the transceiver 610 are not limited to the RF transmitter and the RF receiver.

Also, the transceiver 610 may receive and output, to the processor 630, a signal through a wireless channel, and transmit a signal output from the processor 630 through the wireless channel.

The memory 620 may store a program and data required for operations of the base station. Also, the memory 620 may store control information or data included in a signal obtained by the base station. The memory 620 may be a storage medium, such as read-only memory (ROM), random access memory (RAM), a hard disk, a CD-ROM, and a DVD, or a combination of storage media.

The processor 630 may control a series of processes such that the base station operates as described above. For example, the transceiver 610 may receive a data signal including a control signal transmitted by the terminal, and the processor 630 may determine a result of receiving the control signal and the data signal transmitted by the terminal.

Figure 7:
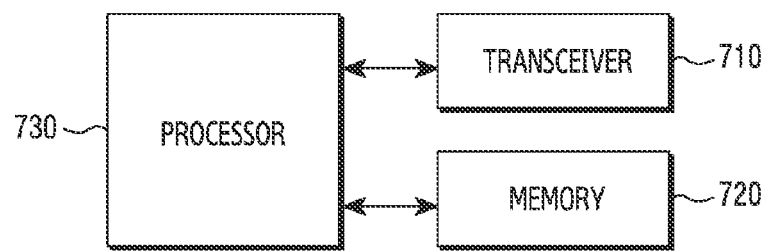
FIG. 7 illustrates a structure of a network entity according to an embodiment of the present disclosure.

FIG. 7 illustrates a structure of a network entity according to an embodiment of the present disclosure.

As shown in FIG. 7, the network entity of the present disclosure may include a transceiver 710, a memory 720, and a processor 730. The transceiver 710, the memory 720, and the processor 730 of the network entity may operate according to a communication method of the network entity described above. However, the components of the terminal are not limited thereto. For example, the network entity may include more or fewer components than those described above. In addition, the processor 730, the transceiver 710, and the memory 720 may be implemented as a single chip. Also, the processor 730 may include at least one processor.

The transceiver 710 collectively refers to a network entity receiver and a network entity transmitter, and may transmit/receive a signal to/from a base station or a UE. The signal transmitted or received to or from the base station or the UE may include control information and data. In this regard, the transceiver 710 may include a RF transmitter for up-converting and amplifying a frequency of a transmitted signal, and a RF receiver for amplifying low-noise and down-converting a frequency of a received signal. However, this is only an example of the transceiver 710 and components of the transceiver 710 are not limited to the RF transmitter and the RF receiver.

Also, the transceiver 710 may receive and output, to the processor 730, a signal through a wireless channel, and transmit a signal output from the processor 730 through the wireless channel.

The memory 720 may store a program and data required for operations of the network entity. Also, the memory 720 may store control information or data included in a signal obtained by the network entity. The memory 720 may be a storage medium, such as ROM, RAM, a hard disk, a CD-ROM, and a DVD, or a combination of storage media.

The processor 730 may control a series of processes such that the network entity operates as described above. For example, the transceiver 710 may receive a data signal including a control signal, and the processor 730 may determine a result of receiving the data signal.

At least some of the example embodiments described herein may be constructed, partially or wholly, using dedicated special-purpose hardware. Terms such as "component," "module" or "unit" used herein may include, but are not limited to, a hardware device, such as circuitry in the form of discrete or integrated components, a field programmable gate array (FPGA) or application specific integrated circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of conducting localisation based on proximity services (ProSe) for a set of user equipments (UEs) in a fifth generation (5G) network, the method comprising:
   initiating a 5G ProSe direct communication between UEs of the set of UEs and a reference UE;
   relaying location information from a remote UE included in the set of UEs via the reference UE and a 5G core (5GC) entity for a location management function (LMF);
   registering, by the set of UEs, ProSe capabilities thereof with access and mobility management function (AMF), wherein a UE is selected from the set of UEs or from outside the set of UEs when the UE is in device to device (D2D) range as the reference UE, and the reference UE is fulfilled by a positional reference unit (PRU); and
   starting, by the LMF, localisation procedures.

2. The method according to claim 1, wherein registering, by the set of UEs, the ProSe capabilities thereof with the AMF comprises providing, by the set of UEs to the AMF, location privacy indicators (LPIs) for the localisation based on the ProSe thereof.

3. The method according to claim 1, further comprising identifying, by the LMF, the set of UEs with a certain group or a collective behaviour.

4. The method according to claim 3, wherein identifying, by the LMF, the set of JEs with the certain group or the collective behaviour is performed based on an internal logic within the LMF or input data from other network functions (NFs).

5. The method according to claim 3, wherein identifying, by the LMF, the set of UEs with the certain group or the collective behaviour comprises determining, by the LMF, all UEs within an area of interest for ProSe based localisation, leaving any grouping or pairing to direct discovery protocol of the ProSe.

6. The method according to claim 1, further comprising checking, by the LMF, the ProSe capabilities of the set of UEs registered with the AMF.

7. The method according to claim 1, further comprising:
   requesting or subscribing, by the LMF, a newly defined service of a ProSe application server (AS) to initiate a relay for a location reporting for the set of UEs; or
   interacting, by the LMF with a policy control function (PCF) to initiate the relay for the location reporting for the set of UEs.

8. The method according to claim 7, further comprising authorizing and configuring, by a ProSe AS or the PCF, a UE of the set of UEs as the reference UE, through which the other UEs of the set of UEs relay location information to the 5GC and LMF, wherein the reference UE is located outside the set of UEs while locating within a D2D range or the reference UE is fulfilled by a positional reference unit (PRU).

9. The method according to claim 8, further comprising configuring or provisioning the reference UE with special relay service codes (RSCs) authorized for the location reporting, wherein the special RSCs are provided by the PCF or already provisioned in a mobile equipment (ME), the reference UE, or configured in a universal integrated circuit card (UICC).

10. The method according to claim 9, further comprising authorizing, configuring, or provisioning, by the ProSe application server or the PCF, the other UEs of the set of UEs with special RSCs authorized for a location reporting, wherein the special RSCs are provided by the PCF, already provisioned in the ME, or configured in the UICC.

11. The method according to claim 10, further comprising conducting ProSe relay discovery on the identified set of UEs with the special RSCs based on either discovery model A or discovery model B.

12. The method according to claim 11, further comprising establishing connections over PC5 between the reference UE and the other UEs of the set of UEs for the discovered set of UEs.

13. The method according to claim 1, further comprising responding or notifying, by the ProSe AS or a PCF to the LMF, when a relay configuration is complete.

14. The method according to 8, further comprising requesting, by LMF location data from multiple UEs of the set of UEs via the reference UE.

15. The method according to claim 14, further comprising:
   initiating, by the reference UE, a side-link based positioning for the multiple UEs of the set of UEs;
   obtaining, by the reference UE through the side-link, position estimates from the set of UEs;
   obtaining, by the reference UE through the side-link, which UE of the set of UEs carries out UE based positioning;
   obtaining, by the reference UE through the side-link, positioning assistance data from the set of UEs; and
   executing, by the reference UE through the side-link, a side-link based positioning procedure and gaining position information of a group of UEs.

16. The method according to claim 15, further comprising relaying, by the reference UE, location reporting data back to the LMF.

17. The method according to claim 15, wherein the side-link based positioning procedure is carried out with a positional reference unit (PRU) instead of a reference UE.

18. The method according to claim 1, wherein a signalling overhead reduction is performed by at least one of a positioning protocol messages or a range extension by gaining location information of UEs outside a network coverage area.

19. The method according to claim 1, wherein location information is passed onto a location service (LCS) client through the AMF and a gateway mobile location centre (GMLC).

20. The method according to claim 1, wherein the 5G network comprises a set of UEs, an access and mobility management function (AMF), a location management function (LMF), and a ProSe application server (AS).

* * * * *